(12) United States Patent
Furuta

(10) Patent No.: US 8,891,558 B2
(45) Date of Patent: Nov. 18, 2014

(54) COMMUNICATION DEVICE, PACKET SYNCHRONIZATION METHOD

(75) Inventor: Daitarou Furuta, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/137,758

(22) Filed: Sep. 9, 2011

(65) Prior Publication Data

US 2011/0317724 A1 Dec. 29, 2011

Related U.S. Application Data

(63) Continuation of application No. PCT/JP2009/001122, filed on Mar. 12, 2009.

(51) Int. Cl.
*H04J 3/06* (2006.01)
*H04L 7/00* (2006.01)
*H04L 1/00* (2006.01)
*H04L 7/04* (2006.01)
*H04L 7/10* (2006.01)

(52) U.S. Cl.
CPC .............. *H04L 1/0045* (2013.01); *H04L 7/048* (2013.01); *H04L 7/042* (2013.01); *H04L 7/10* (2013.01); *H04L 1/0061* (2013.01)
USPC ........................................................ 370/503

(58) Field of Classification Search
USPC ........... 370/230, 332, 338; 714/758; 709/236, 709/230
See application file for complete search history.

(56) References Cited

U.S. PATENT DOCUMENTS

| | | | |
|---|---|---|---|
| 6,298,387 B1* | 10/2001 | Prasad et al. | 709/236 |
| 7,844,884 B2 | 11/2010 | Roh et al. | |
| 2001/0014088 A1* | 8/2001 | Johnson et al. | 370/338 |
| 2002/0101842 A1* | 8/2002 | Harrison et al. | 370/338 |
| 2003/0123389 A1* | 7/2003 | Russell et al. | 370/230 |
| 2007/0130495 A1* | 6/2007 | Yoon et al. | 714/758 |
| 2007/0189226 A1* | 8/2007 | Roh et al. | 370/332 |
| 2008/0226006 A1 | 9/2008 | Kondo | |

FOREIGN PATENT DOCUMENTS

| | | |
|---|---|---|
| JP | 6-252874 | 9/1994 |
| JP | 2007-89161 | 4/2007 |
| JP | 2007-195185 | 8/2007 |
| JP | 2008-227875 | 9/2008 |

OTHER PUBLICATIONS

International Search Report for PCT/JP2009/001122, mailed Apr. 14, 2009.

(Continued)

*Primary Examiner* — Donald Mills
*Assistant Examiner* — Derrick V Rose
(74) *Attorney, Agent, or Firm* — Staas & Halsey LLP

(57) ABSTRACT

A communication device is provided, with which packet synchronization is achieved based on input data transmitted by an external device, without using a special protocol between the communication device and the external device. An external TE attaches a CRC code to each packet before transferring data to a mobile terminal (UE). Data is bulk transferred from the external TE to the UE according to a USB protocol. At the UE, the CRC code of the input data is detected at a CRC processing unit 19. When the CRC code is detected, a first packet detecting unit 14 detects the first packet by reading a packet length. Once the first packet is detected, a second packet detection unit 15a detects succeeding packets by sequentially reading packet lengths.

6 Claims, 14 Drawing Sheets

(56) References Cited

OTHER PUBLICATIONS

3GPP TS 36.133 V8.4.0 (Dec. 2008): $3^{rd}$ Generation Partnership Project; Technical Specification Group Access Network; "Evolved Universal Terrestrial Radio Access (E-UTRA); Requirements for support of radio resource management" (Release 8), 126pp.

Office Action issued by the Japanese Patent Office on May 21, 2013 in the corresponding Japanese patent application No. 2011-503562.

* cited by examiner

COMMUNICATION DEVICE, PACKET SYNCHRONIZATION METHOD

CROSS-REFERENCE TO RELATED APPLICATION

This patent application is a continuation application of and claims the benefit of priority under 35 USC 120 and 365(c) of PCT application JP2009/001122 filed in Japan on Mar. 12, 2009, the entire contents of which are incorporated herein by reference.

TECHNICAL FIELD

The present invention is related to a technology of achieving synchronization of packets included in input data in data transfer.

BACKGROUND ART

In 3GPP (3rd Generation Partnership Project), LTE (Long Term Evolution) is being discussed as a next generation wireless communications system. In LTE, there are plans for using a wireless access network referred to as E-UTRAN (Evolved UMTS Terrestrial Radio Access Network) and providing services for traffic based on IP (Internet Protocol). Specifications of E-UTRAN are disclosed in, for example, non-patent document 1.

Non-patent document 1: 3GPP TS 36.133 V8.4.0 (2008-12):3rd Generation Partnership Project; Technical Specification Group Radio Access Network; "Evolved Universal Terrestrial Radio Access (E-UTRA); Requirements for support of radio resource management" (Release 8)

DISCLOSURE OF INVENTION

Problems to be Solved by the Invention

Incidentally, conventionally, when a communication device such as a mobile terminal (UE: User Equipment) transfers data by performing USB (Universal Serial Bus) communications with an external device, a protocol such as PPP (Point to Point Protocol) is used. When a relatively large amount of data is transferred by USB communications, a bulk transfer mode is applied each time a predetermined amount of data is transferred (that is to say, the data is transferred without considering layers). In PPP, synchronization of PPP frames is easily achieved by detecting the front flags of PPP frames.

However, when data transferred from an external device by USB communications is received by a communication device such as a mobile terminal belonging to a next generation wireless communications system where it is assumed that all data is processed by IP packets, the following condition is preferable. Specifically, synchronization of IP packets is preferably achieved without considering PPP, from the viewpoint of reducing processing load in upper-level layers. That is to say, there is a need for a communication device that achieves packet synchronization based on input data transmitted by an external device, without using a special protocol between the communication device and the external device.

Means to Solve the Problems

According to a first aspect, a communication device is provided for achieving packet synchronization with respect to data input from an external device.

The communication device includes
(A) a first detecting unit configured to detect a check code by obtaining a desired check result by performing a check for each time a unit data amount of data is input, wherein the check is based on a predetermined amount of first input data being set as the check code and input data preceding the first input data being set as check target data;
(B) a first header analysis unit configured to estimate that a front position of the check target data at the time when said first detecting unit detects the check code corresponds to a front position of a header of a first packet, and to read a packet length of said first packet from the header of the first packet;
(C) a first determination unit configured to determine whether a length of the check target data at the time when said first detecting unit detects the check code matches the packet length of the first packet read by said first header analysis unit; and
(D) a second header analysis unit configured to estimate that a front position of input data succeeding the check code detected by the first detecting unit corresponds to a front position of a header of a second packet succeeding said first packet, and to read a packet length of said second packet from the header of the second packet.

In this communication device, a first packet is detected as input data corresponding to a packet length read by the first determination unit. Once the first packet is detected, a second packet is detected, as succeeding input data corresponding to a packet length read by a second analysis unit. Accordingly, packet synchronization is achieved with respect to the input data.

According to another aspect, a packet synchronization method is provided, by which the same process as that of the communication device is performed.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BEST MODE FOR CARRYING OUT THE INVENTION (1) First Embodiment

A description is given of a mobile terminal that is a first embodiment of a communication device according to the present invention.

(1-1) Communications Between Mobile Terminal (UE) and External TE

Figure 1:
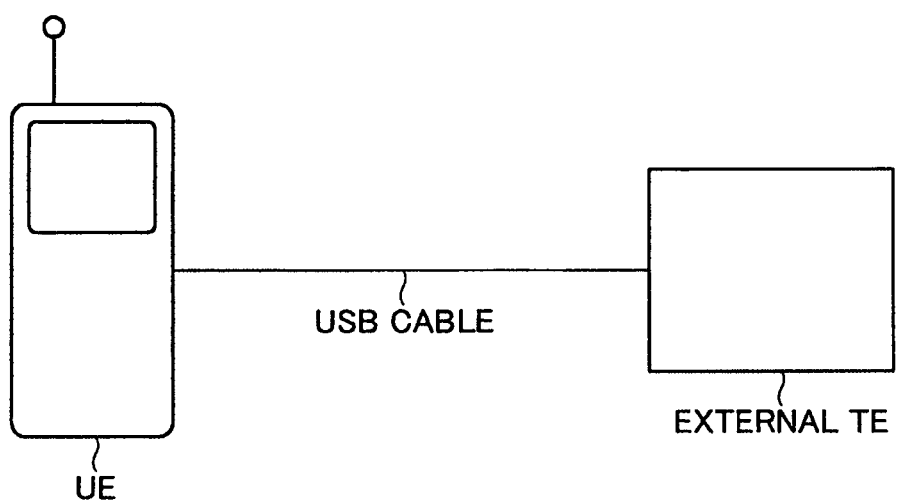
FIG. 1 illustrates a system configuration including a mobile terminal and an external TE according to a first embodiment.

FIG. 1 illustrates a communication system including a mobile terminal (UE: User Equipment) according to the present embodiment and an external TE (Terminal Equipment) such as a personal computer. In FIG. 1, the mobile terminal and the external TE are connected by a USB (Universal Serial Bus) cable.

Here, it is assumed that the mobile terminal exchanges a large amount of data such as image data with the external TE through the USB cable, in a bulk transfer mode. When the external TE transmits data to the mobile terminal by bulk transfer according to the USB protocol, the data is sequentially transmitted in units of a predetermined transfer amount (1 through 512 bytes) from the external TE to the mobile terminal, without recognizing layers of the transfer data.

In the communication system illustrated in FIG. 1, at the external TE, a CRC (Cyclic Redundancy Check) code is attached to the end of an IP packet before data transfer. When USB communications are performed between the mobile terminal and the external TE, the data is exchanged with the CRC codes attached to the IP packets. The type of CRC is determined in advance between the mobile terminal and the external TE. For example, in the present embodiment, CRC-16 is used. Accordingly, the mobile terminal according to the present embodiment detects an IP packet by detecting a CRC code in the bulk data transferred by the external TE (in the following description, expressions such as "achieve packet synchronization" and "synchronous detection" are appropriately used).

(1-2) Configuration of Mobile Terminal (UE)

Figure 2:
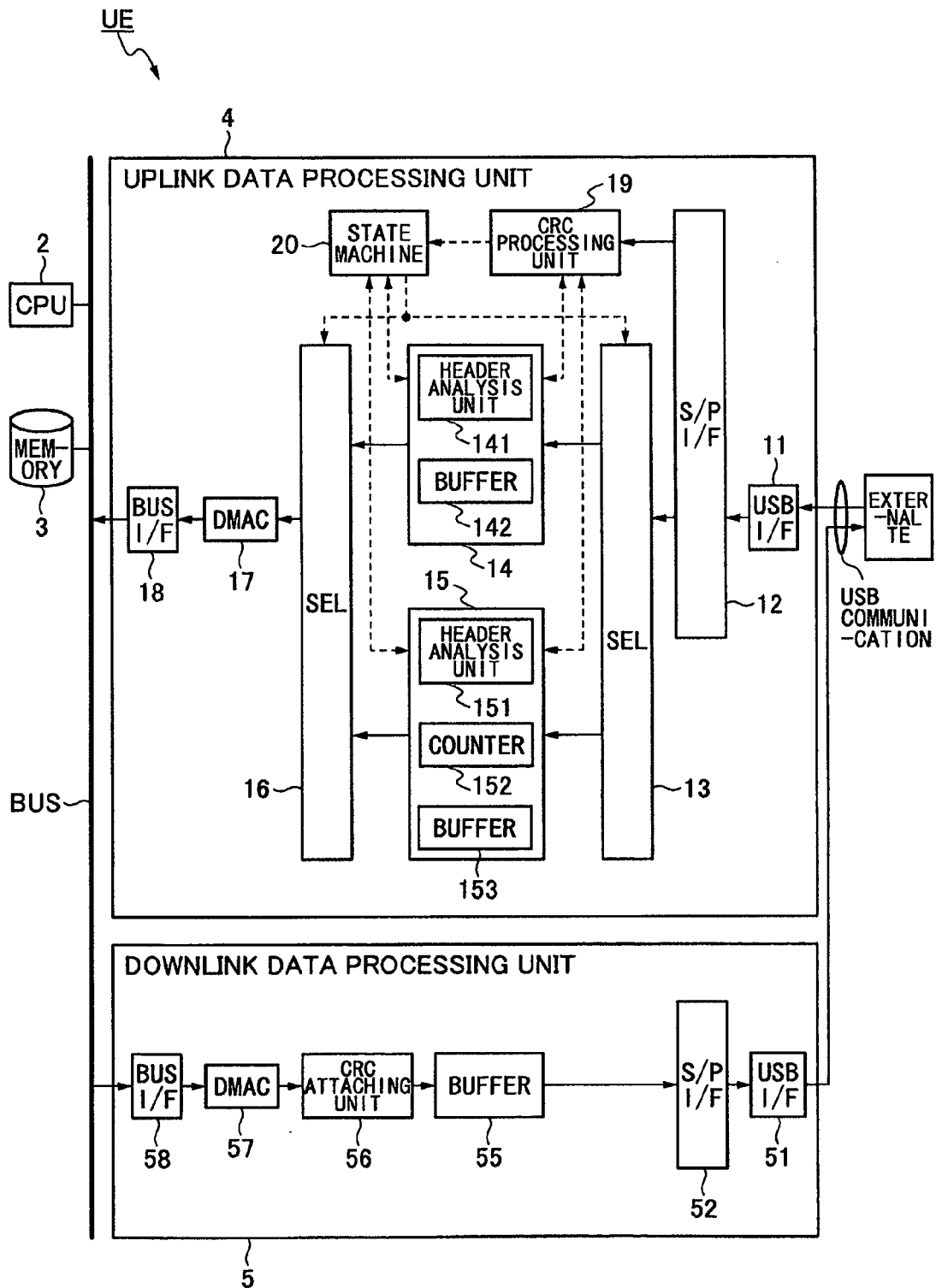
FIG. 2 is a block diagram indicating relevant parts of a configuration of the mobile terminal according to the first embodiment.

Next, a description is given of a configuration of the mobile terminal according to the present embodiment with reference to FIG. 2. FIG. 2 is a block diagram indicating relevant parts of the configuration of the mobile terminal according to the present embodiment.

As illustrated in FIG. 2, the mobile terminal (UE) includes a CPU 2, a memory 3, an uplink data processing unit 4, and a downlink data processing unit 5.

The uplink data processing unit 4 includes a USB interface (USB I/F) 11, an S/P (Serial/Parallel) interface (S/P I/F) 12, selectors (SEL) 13 and 16, a first packet detecting unit 14, a second packet detecting unit 15, a DMA (Direct Memory Access) controller (DMAC) 17, a bus interface (BUS I/F) 18, a CRC processing unit (first detecting unit) 19, and a state machine 20.

The downlink data processing unit 5 includes a USB interface (USB I/F) 51, an S/P (Serial/Parallel) interface (S/P I/F) 52, a buffer (BUF) 55, a CRC attaching unit 56, a DMA (Direct Memory Access) controller (DMAC) 57, and a bus interface (BUS I/F) 58.

In FIG. 2, solid arrows indicate the flow of processing transfer data, and dashed arrows indicate the flow of processing internal control data. Furthermore, data processing in the uplink data processing unit 4 and the downlink data processing unit 5 is sequentially performed in units of predetermined clocks.

A description is given of a configuration of the uplink data processing unit 4, in line with the flow of processing uplink data.

The USB interface 11 receives data from the external TE through the USB cable, according to the USB protocol. In the description of the present embodiment, it is assumed that data is bulk-transferred in a data transfer mode according to the USB protocol. In bulk transfer, a relatively large amount of data is transferred in a nonperiodic manner from the external TE to the mobile terminal.

In the uplink data processing unit 4, the first packet detecting unit 14 or the second packet detecting unit 15 transmits, to the state machine 20, a PACKET_RCVD signal indicating whether a packet is detected (hereinafter, for example, it is assumed that an H level indicates that a packet is not detected and an L level indicates that a packet is detected).

In the uplink data processing unit 4, the first packet detecting unit 14 or the second packet detecting unit 15 transmits, to the state machine 20, a CRC_OK signal indicating OK/NOK of CRC detection (hereinafter, for example, it is assumed that an H level indicates "CRC detection NOK" and an L level indicates "CRC detection OK").

The S/P interface 12 converts serial data from the USB interface 11 into parallel data having a data size suited to CRC detection such as a width of one byte. The one-byte data (data of the unit data amount) is output to the selector 13 and the CRC processing unit 19.

The selector 13 outputs, to either the first packet detecting unit 14 or the second packet detecting unit 15, the one byte data from the S/P interface 12 in response to a control instruction from the state machine 20.

The CRC processing unit 19 is configured to perform CRC calculation in a parallel manner on data having a one byte width from the S/P interface 12 in one clock. In the present embodiment, in the CRC processing unit 19, CRC of 16 bits (CRC-16) is applied, and a generating polynomial of, for example, $X^{16}+X^{15}+X^{2}+1$ is used, although the generating polynomial of CRC is not so limited. The CRC processing unit 19 performs a modulo operation using the generating polynomial, and reports the check result to the state machine 20. Specifically, when the remainder of the modulo operation is a desired value (typically "zero"), CRC detection OK is determined, and a CRC_OK signal of an L level is transmitted to the state machine 20.

The CRC processing unit 19 includes a buffer (not illustrated) for sequentially storing the one byte data from the S/P interface 12. When the CRC processing unit 19 performs CRC detection in response to a control instruction from the first packet detecting unit 14, the CRC processing unit 19 sequentially performs the module operation (check operation) on the check target data in the buffer, assuming that the 16 bit data that is input last is the CRC code (check code). As a result, when a CRC code is detected, i.e., when CRC detection is OK, the internal buffer is reset.

Figure 3:
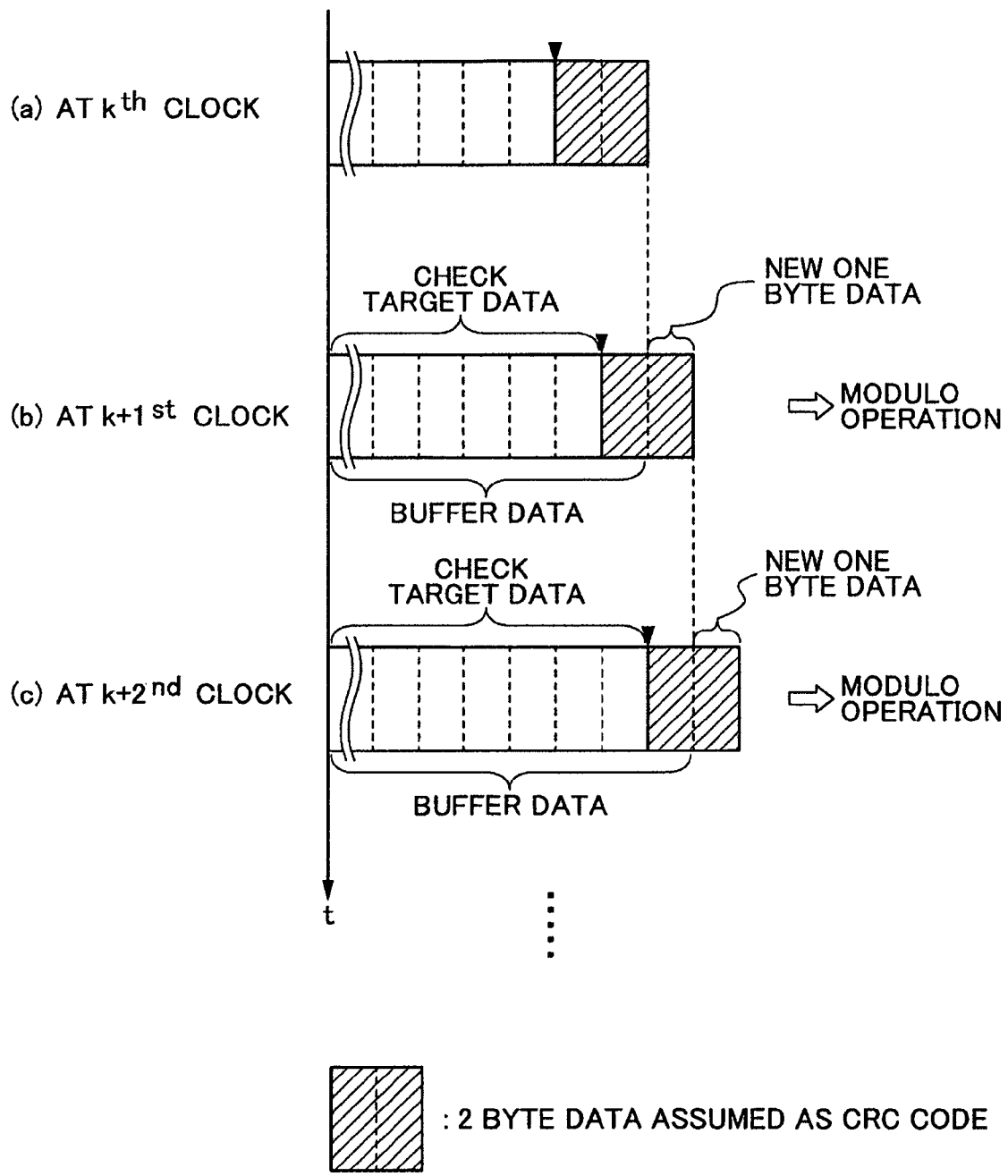
FIG. 3 is for describing a CRC detection process.

A description is given of a process of the CRC processing unit 19 with reference to FIG. 3.

FIG. 3 illustrates CRC detection processes at respective clocks when CRC detection is performed in response to a control instruction from the first packet detecting unit 14. FIG. 3 illustrates module operation processes at consecutive clocks ($k^{th}$ clock through $k+2^{nd}$ clock) in time series. In FIG.

3, in the process performed at the k+1$^{st}$ clock indicated at (b), it is assumed that the last one byte in the buffer and one byte data that is newly input are assumed to be the CRC code, and the modulo operation is performed on the remaining data in the buffer which is the check target data.

In the process at the k+2$^{nd}$ clock at (c), another new one byte data item is acquired, and the last two byte data including this new one byte data item is assumed to be CRC, and a modulo operation is performed on the remaining data in the buffer as check target data. The check target data processed at this stage is incremented by one byte compared to the process performed at the k+1$^{st}$ clock.

Similarly, every time the CRC processing unit 19 acquires a new one byte data item, the CRC processing unit 19 updates the check target data and the assumed CRC code, and searches for a CRC code where the remainder of the modulo operation is, for example, "zero".

Referring back to FIG. 2, the first packet detecting unit 14 includes a header analysis unit 141 (first header analysis unit) and a buffer (BUF) 142, and achieves IP packet synchronization by detecting the CRC code that is attached to the end of the packet. When the packet is first detected, the first packet detecting unit 14 performs packet detection.

The buffer 142 has a capacity corresponding to at least the size of a packet, and one byte data items transferred from the selector 13 are sequentially stored in the buffer 142. In the buffer 142, the same data as the check target data processed at the CRC processing unit 19 at each clock is stored.

When the CRC detection by the CRC processing unit 19 is OK, the first packet detecting unit 14 receives a CRC_OK signal of an L level from the state machine 20. When a CRC_OK signal of an L level is received, the header analysis unit 141 recognizes that the data stored in the buffer 142 is a packet, and analyzes the header starting from the front position of the stored data. That is to say, in the case of an IP packet, the field configuration in a head is already known, and therefore the header analysis unit 141 reads the packet length (total length) from the header. The first packet detecting unit 14 (first determination unit) determines whether the packet length read by the header analysis unit 141 matches the length of the data in the buffer 142. That is to say, the first packet detecting unit 14 verifies the packet length.

When the length of data in the buffer 142 matches the packet length, the first packet detecting unit 14 transmits a PACKET_RCVD signal of an L level to the state machine 20. The detected packet is transferred to the memory 3 through the bus interface 18 and the bus under the control of the DMA controller 17.

As illustrated in FIG. 2, the second packet detecting unit 15 includes a header analysis unit 151 (second header analysis unit), a counter 152, and a buffer (BUF) 153. The buffer 153 has a capacity corresponding to at least the size of a packet that is expected to be received.

After a packet is detected by the first packet detecting unit 14, the process performed by the second packet detecting unit 15 is started under the control of the state machine 20. That is to say, under the control of the state machine 20, the selector 13 switches the data output destination (the output destination of the one byte data is switched from the first packet detecting unit 14 to the second packet detecting unit 15). At this point, the header analysis unit 151 estimates that the front position of the data input from the selector 13 is the front position of the header of the packet succeeding the packet that has already been detected, and reads the packet length from a predetermined field of this header.

The counter 152 is a byte counter that counts the bytes every time one byte is input from the selector 13. The counter 152 sequentially stores the one byte data from the selector 13 in the buffer 153.

The second packet detecting unit 15 stops the counter 152 when the value of the counter 152 reaches a value (number of bytes) corresponding to the packet length that has been read, and sends a PACKET_RCVD signal of an L level to the state machine 20. The packets stored in the buffer 153 are transferred to the memory 3 through the bus interface 18 and the bus under the control of the DMA controller 17. After a PACKET_RCVD of an L level is transmitted, the counter 152 is cleared.

The state machine 20 is provided for controlling the process in the uplink data processing unit 4 while performing predetermined state transitions.

Figure 4:
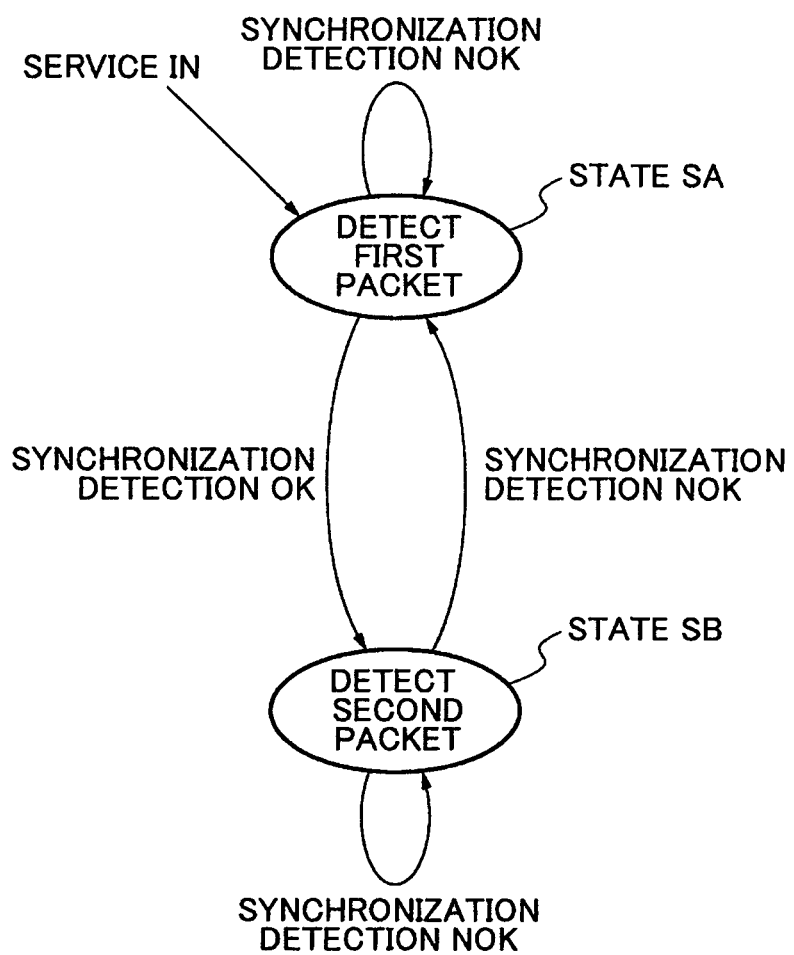
FIG. 4 is a state transition diagram of a state machine in the mobile terminal according to the first embodiment.

FIG. 4 is a state transition diagram of the state machine 20. A description is given of state transitions of the state machine 20 in association with operations in the uplink data processing unit 4 in the respective states.

In FIG. 4, when the process of the uplink data processing unit 4 is started (service in), the state machine 20 is in a state (state SA) where the first packet detecting unit 14 detects packets (first packet detection). Accordingly, the selectors 13 and 16 are controlled so that one bit data from the S/P interface 12 is sequentially input to the first packet detecting unit 14 and the first packet detecting unit 14 performs the packet detection process.

When the CRC processing unit 19 detects CRC and the verification result of the packet length performed by the first packet detecting unit 14 is OK (synchronization detection OK), the state machine 20 transits to a state (state SB) where the second packet detecting unit 15 detects packets (second packet detection). Accordingly, the selectors 13 and 16 are controlled so that one bit data from the S/P interface 12 is sequentially input to the second packet detecting unit 15 and the second packet detecting unit 15 performs the packet detection process.

The second packet detecting unit 15 may verify the packet length that has been read, depending on whether the packet length that has been read is within an expected packet length range. When the packet length is NOK (not OK), i.e., when synchronization detection is NOK, the state machine 20 preferably transits from the state of the second packet detection to the state of the first packet detection, as illustrated in FIG. 4.

Referring back to FIG. 2, in the downlink data processing unit 5, data of PDCP (Packet Data Convergence Protocol)-SDU (Service Data Unit) is input to the CRC attaching unit 56 from the memory 3 through the bus and the bus interface 58, under the control of the DMA controller 57. The CRC attaching unit 56 generates CRC codes for the respective PDCP-SDU, and transfers the PDCP-SDU with CRC codes attached. The PDCP-SDU data with CRC codes attached is transferred to the external TE from the USB interface 51 through the S/P interface 52, in a nonperiodic manner, for example, by bulk transfer, in units of a predetermined amount of data.

(1-3) Uplink Data Process

Figure 5:
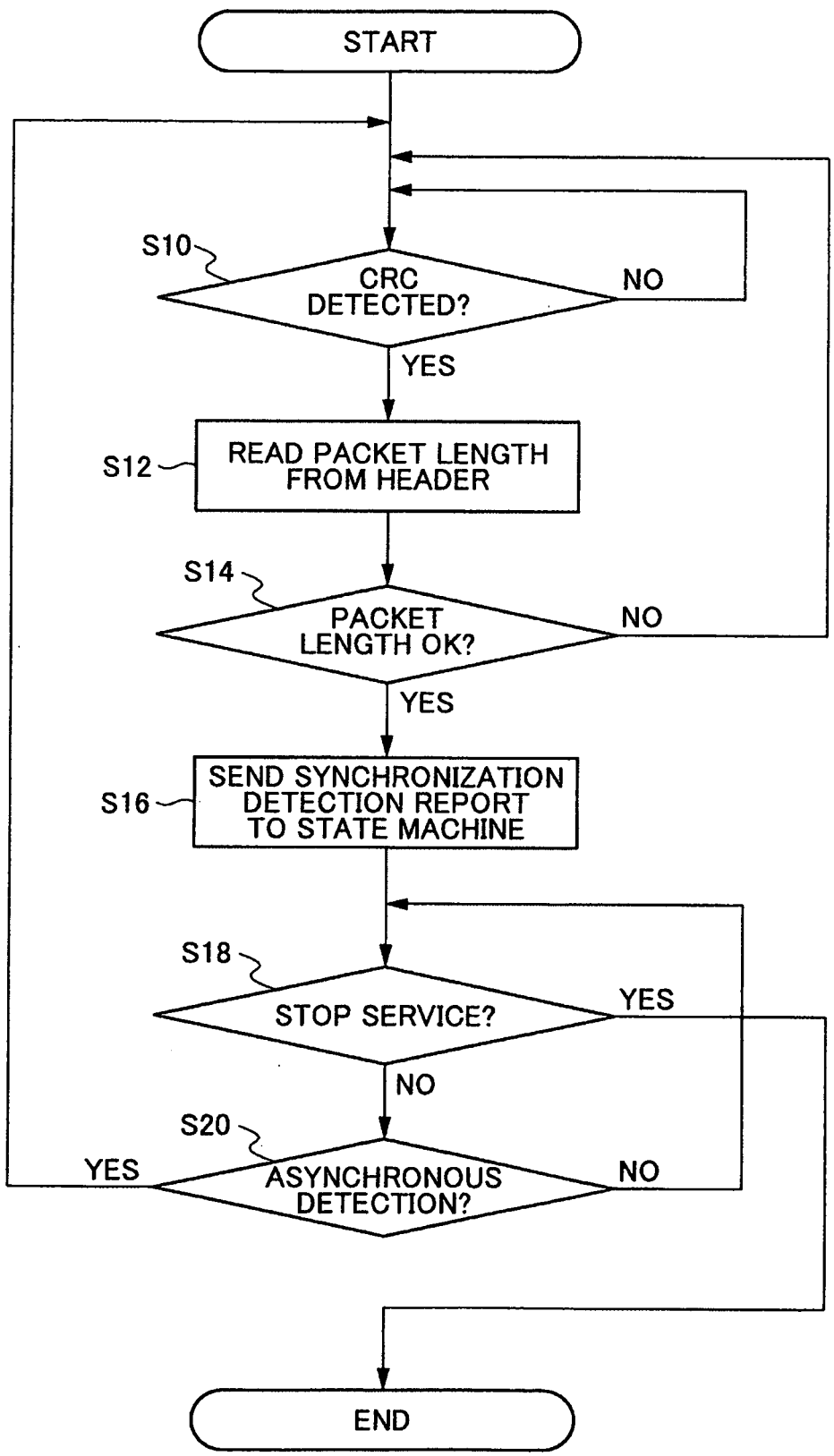
FIG. 5 is a flowchart of a process in the mobile terminal according to the first embodiment.
Figure 6:
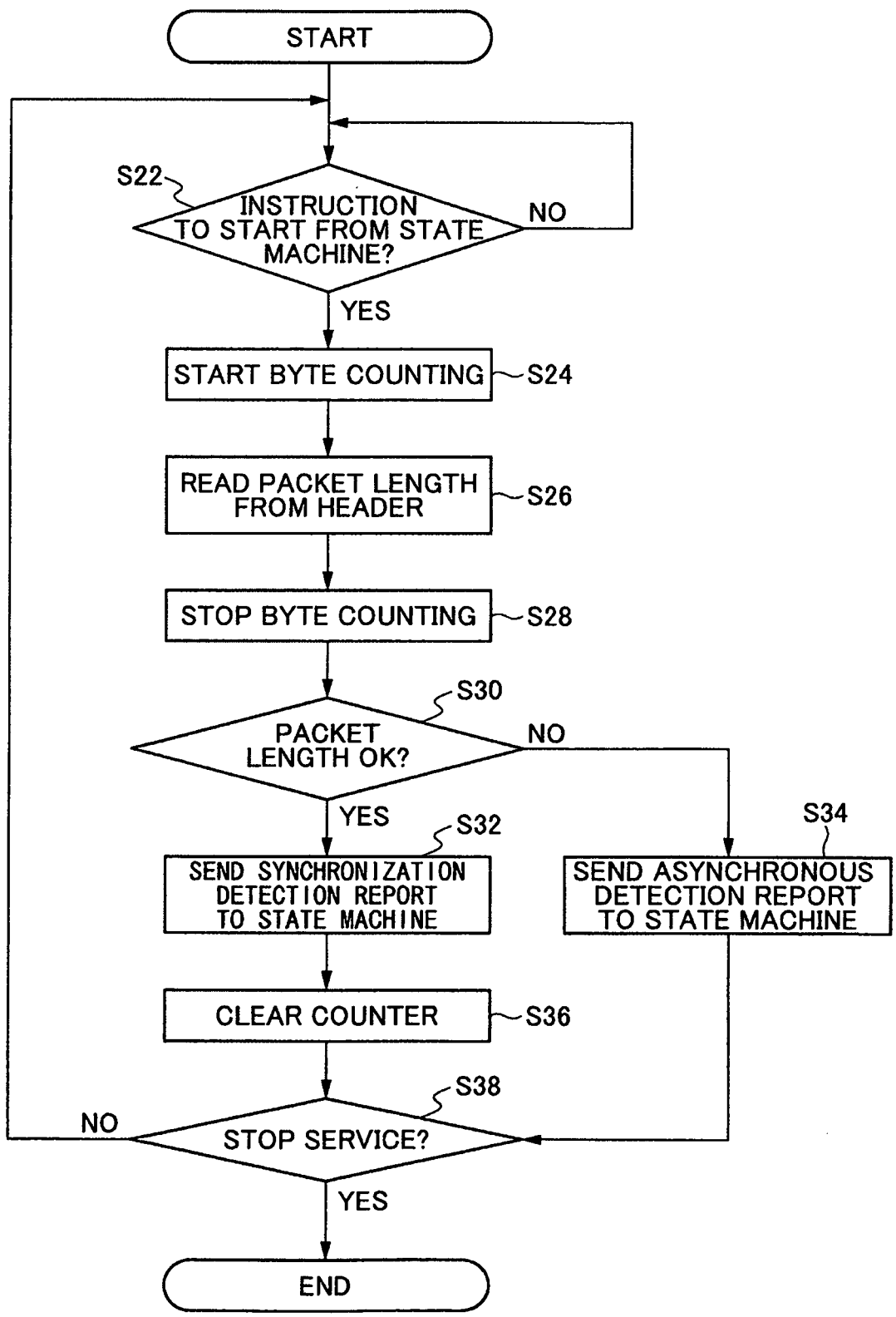
FIG. 6 is a flowchart of a process in the mobile terminal according to the first embodiment.
Figure 7:
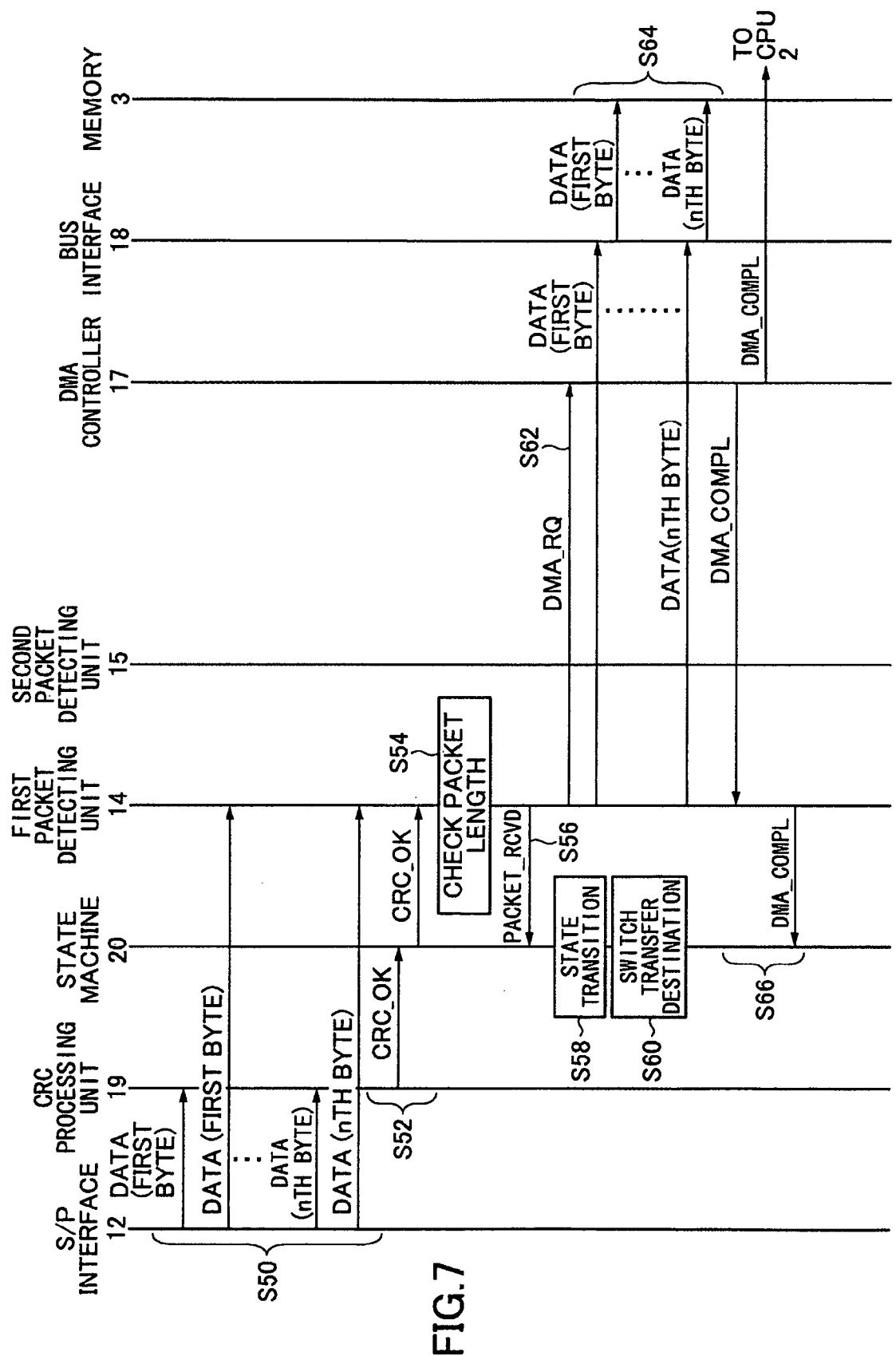
FIG. 7 is a flowchart of a data flow in the mobile terminal according to the first embodiment.
Figure 8:
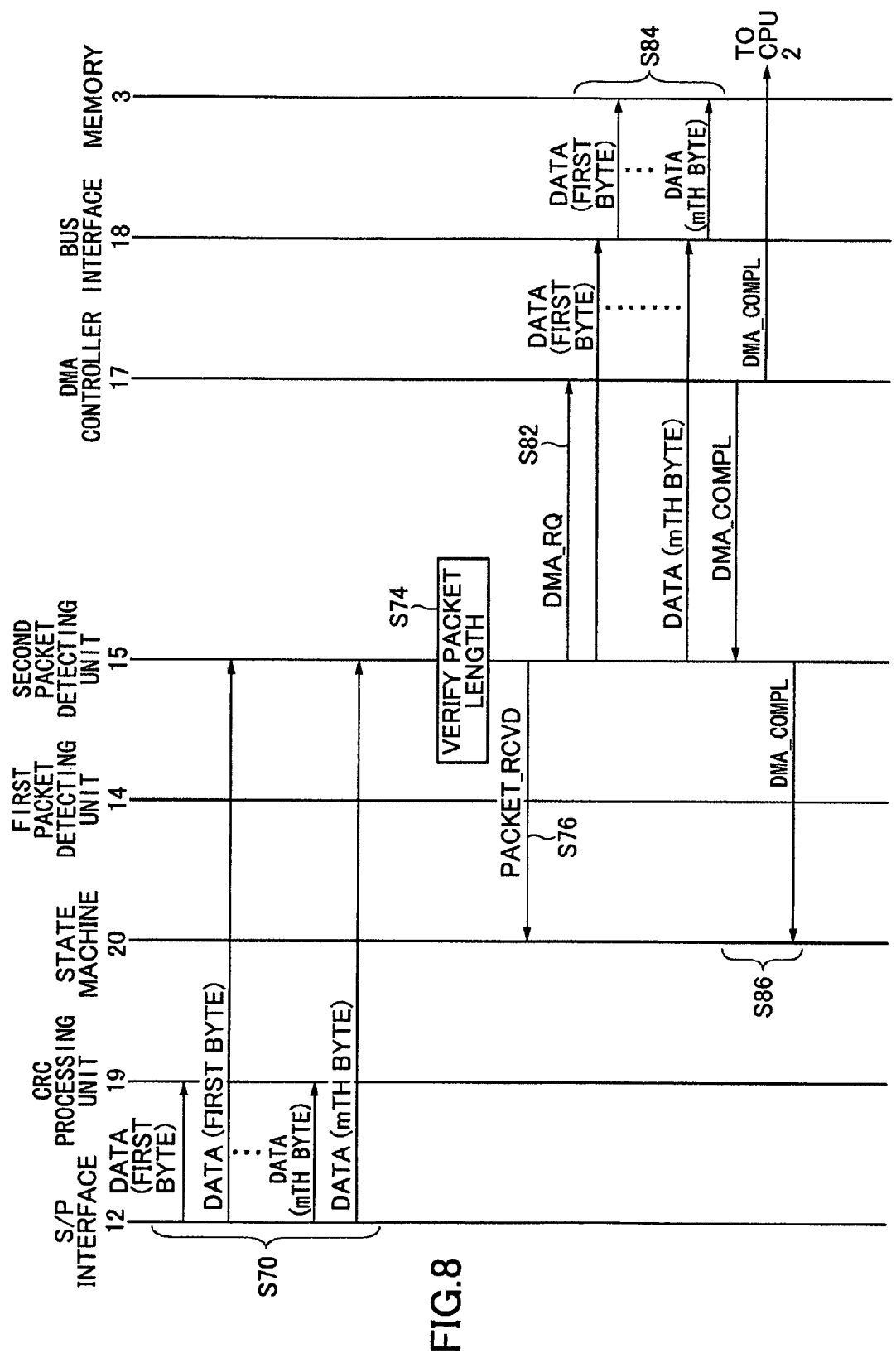
FIG. 8 is a flowchart of a data flow in the mobile terminal according to the first embodiment.

Next, a description is given of an uplink data process in the mobile terminal according to the present embodiment, with reference to FIGS. 5 through 8. FIGS. 5 and 6 are flowcharts respectively illustrating processes performed when the state machine 20 is in the state SA and the state SB. FIGS. 7 and 8 are flowcharts respectively illustrating data flows when the state machine 20 is in the state SA and the state SB.

The following separately describes (A) a process performed when the state machine 20 is in the state SA and (B) a process performed when the state machine 20 is in the state SB.

(A) Process Performed when State Machine 20 is in State SA

First, when a packet is to be detected, the state machine 20 transits to a state SA (see FIG. 4), and the selectors 13 and 16 are controlled so that a process in the first packet detecting unit 14 is performed. Accordingly, the one byte data from the S/P interface 12 is sequentially transmitted to and stored in the CRC processing unit 19 and the first packet detecting unit 14 (step S50 of FIG. 7). When the CRC processing unit 19 detects a CRC code by successfully performing a modulo operation in units of clocks on the data stored in units of one byte (step S10 of FIG. 5), the CRC processing unit 19 transmits a CRC_OK signal of an L level to the state machine 20. The CRC_OK signal is then transmitted from the state machine 20 to the first packet detecting unit 14 (step S52 of FIG. 7). Accordingly, the first packet detecting unit 14 recognizes that a CRC code has been detected.

Next, the first packet detecting unit 14 estimates that the data stored in the buffer 142 corresponds to the front position of the header of the packet, and reads the packet length from the header (step S12 of FIG. 5). Next, the first packet detecting unit 14 determines whether the length of the data in the buffer 142 matches the packet length that has been read (i.e., whether it is "packet length OK") (step S14 of FIG. 5 and step S54 of FIG. 7). When it is packet length OK, the first packet detecting unit 14 transmits a PACKET_RCVD signal of an L level to the state machine 20 (step S56 of FIG. 7). That is to say, a synchronization detection report is transmitted to the state machine 20 (step S16 of FIG. 5). When it is not packet length OK in step S14 of FIG. 5, CRC detection is performed once again from step S10.

At the state machine 20, services are continued unless an instruction to stop services is received from the CPU 2 (step S18 of FIG. 5). When the state machine 20 receives a PACKET_RCVD signal of an L level from the first packet detecting unit 14 (step S56 of FIG. 7), the state machine 20 transits from a state SA to a state SB (step S58 of FIG. 7; see FIG. 4). Accordingly, the state machine 20 controls the selectors 13 and 16 for shifting to the process of the second packet detecting unit 15. As a result, the transfer destination of the one byte data from the S/P interface 12 is switched from the first packet detecting unit 14 to the second packet detecting unit 15 (step S60 of FIG. 7).

After transmitting the PACKET_RCVD signal of an L level to the state machine 20, the first packet detecting unit 14 transmits, to the DMA controller 17, a DMA_RQ signal requesting DMA for transferring the packet held in the buffer 142 to the memory 3 (step S62 of FIG. 7). Then, the packet in the buffer 142 is sequentially transferred in units of one byte to the memory 3, through the bus interface 18 (step S64 of FIG. 7). When the operation of transferring the packet to the memory 3 is completed, the DMA controller 17 transmits a DMA_COMPL signal indicating that DMA has been completed, to the first packet detecting unit 14 and the CPU 2. The DMA_COMPL signal is then transmitted from the first packet detecting unit 14 to the state machine 20 (step S66 of FIG. 7).

(B) Process Performed when State Machine 20 is in State SB

Once the first packet is detected, the state machine 20 transits to the state SB (see FIG. 4). The state machine 20 instructs the second packet detecting unit 15 to start a process (step S22 of FIG. 6), and the selectors 13 and 16 are controlled. Accordingly, the one byte data from the S/P interface 12 is sequentially transmitted to and stored in the CRC processing unit 19 and the second packet detecting unit 15 (step S70 of FIG. 8).

When data is input from the S/P interface 12, at the second packet detecting unit 15, the counter 152 starts counting the number of input bytes (step S24 of FIG. 6).

The second packet detecting unit 15 estimates that the front position of the data input from the selector 13 is the front position of the header of the packet succeeding the packet that has already been detected, and reads the packet length from a predetermined field of this header (step S26 of FIG. 6). Then, when the counter 152 counts a number of bytes corresponding to the packet length that has been read, the counter 152 stops counting the bytes (step S28 of FIG. 6), and the second packet detecting unit 15 determines at this time point that the data stored in the buffer 153 is a packet.

Preferably, the second packet detecting unit 15 verifies the packet length by determining whether the packet length that has been read is within a range of expected packet lengths (step S30 of FIG. 6 and step S74 of FIG. 8). When the packet length is OK, the second packet detecting unit 15 transmits a PACKET_RCVD signal of an L level as a synchronization detection report to the state machine 20 (step S32 of FIG. 6 and step S76 of FIG. 8), and clears the counter 152 (step S36 of FIG. 6).

When the packet length is not OK in step S30 of FIG. 6, the second packet detecting unit 15 transmits a PACKET_RCVD signal of a H level to the state machine 20. That is to say, an asynchronous detection report is transmitted to the state machine 20 (step S34 of FIG. 6).

After transmitting a PACKET_RCVD signal of an L level to the state machine 20, the second packet detecting unit 15 transmits, to the DMA controller 17, a DMA_RQ signal requesting DMA for transferring the packet held in the buffer 153 to the memory 3 (step S82 of FIG. 8). Then, the packet in the buffer 153 is sequentially transferred in units of one byte to the memory 3, through the bus interface 18 (step S84 of FIG. 8). When the operation of transferring the packet to the memory 3 is completed, the DMA controller 17 transmits a DMA_COMPL signal indicating that DMA has been completed, to the second packet detecting unit 15 and the CPU 2. The DMA_COMPL signal is then transmitted from the second packet detecting unit 15 to the state machine 20 (step S86 of FIG. 8).

Thereafter, the second packet detecting unit 15 continues to detect packets until an instruction to stop services of the state machine 20 is received from the CPU 2 at step S38 of FIG. 6.

When the state machine 20 receives a PACKET_RCVD signal of an H level from the second packet detecting unit 15, i.e., when an asynchronous detection report is transmitted (step S32 of FIG. 6, step S76 of FIG. 8), the inside of the state machine 20 transits from the state SB to the state SA (see FIG. 4), and the process of the first packet detecting unit 14 is resumed (step S20 of FIG. 5).

(1-4) Transfer Uplink Data From External TE to Mobile Terminal (UE)

Figure 9:
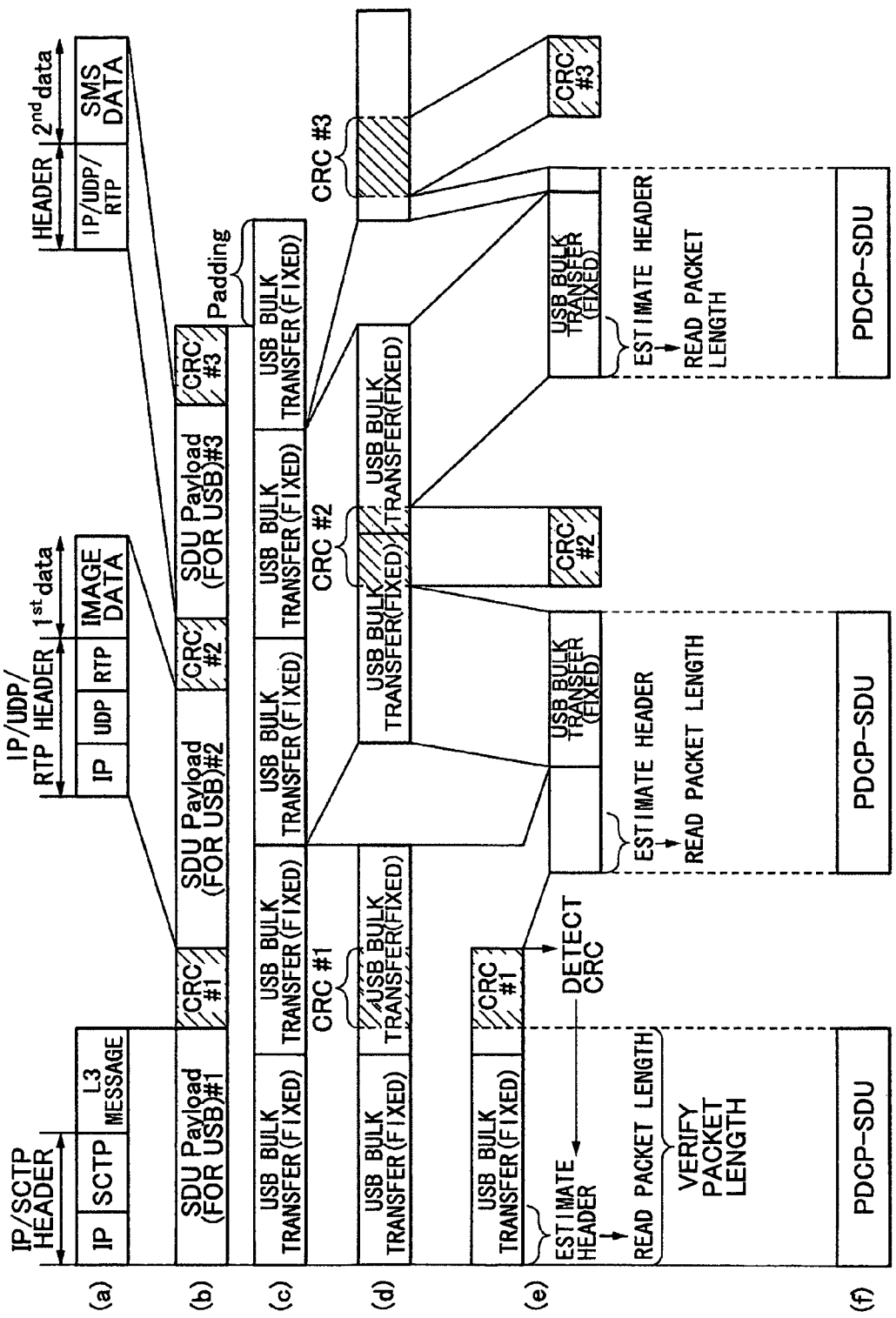
FIG. 9 illustrates the flow of transferring uplink data from the external TE to the mobile terminal according to the first embodiment.

Next, a description is given of transferring uplink data from the external TE to the mobile terminal, with reference to FIG. 9. FIG. 9 illustrates the flow of transferring uplink data from the external TE to the mobile terminal. In FIG. 9, (a) through (c) indicate data processing by the external TE, and (d) through (f) indicate data processing by the mobile terminal.

First, as indicated at FIG. 9 (a), it is assumed in one example that three IP packets are transferred from the external TE to the mobile terminal. The first IP packet includes an IP/SCTP header and a payload of an L3 (layer 3) message.

The second IP packet includes IP/UDP/RTP and a payload of image data (1st data). The third IP packet includes IP/UDP/RTP and a payload of SMS (Short Message Service) data (2nd data). The SCTP (Stream Control Transmission Protocol) is a protocol of a transport layer for performing convergence control. The UDP (User Datagram Protocol) is a protocol of a transport layer implemented to the IP protocol. The RTP (Real-time Transport Protocol) is a data transfer protocol of the transport layer for distributing data streams of audio and video data in a real-time manner.

FIG. 9 illustrates examples of contents of IP packets that are transfer targets. Contents of IP packets that are transfer targets are arbitrary.

As indicated at FIG. 9 (b), in the present embodiment, the external TE attaches CRC codes to IP packets that are the transfer targets, before transferring the data to the mobile terminal. That is to say, the external TE generates CRCs #1 through 3 and attaches the generated CRCs #1 through 3 as CRC codes to the corresponding SDU payloads (for USB) #1 through 3 that are the first to third IP packets.

Next, as indicated at FIG. 9 (c), the external TE bulk transfers the SDU payloads with CRC codes attached in units of data having a fixed size to the mobile terminal according to the present embodiment, according to the USB protocol. As indicated at FIG. 9 (c), padding is applied to the insufficient part for bulk transfer data with a predetermined value (for example, "0"). FIG. 9 (d) indicates USB bulk transfer data received at the mobile terminal. In bulk transfer of USB, data of a fixed length is transferred regardless of the packet configuration of transfer data. Therefore, it is not possible to achieve packet synchronization if the mobile terminal is not implementing any measures.

In FIG. 9 (e), the mobile terminal performs a process on the uplink data described with reference to FIGS. 7 and 8. That is to say, at the uplink data processing unit 4 of the mobile terminal, the first packet detecting unit 14 mainly operates to detect the CRC #1, estimate the header and read the packet length, and confirm whether the packet length is OK (normal). Accordingly, the first IP packet having the CRC #1 attached is detected.

Once the first IP packet is detected, the second packet detecting unit 15 mainly operates to estimate the header from the data succeeding the CRC #1 and read the packet length. Accordingly, the next IP packet having the CRC #2 attached is detected. Similarly, the next IP packet having the CRC #3 attached is detected.

As indicated in FIG. 9 (f), the respective IP packets detected at FIG. 9 (e) become PDCP-SDU (PDCP payload). In the mobile terminal according to the present embodiment, a PDCP header, a RLC header, and a MAC header are attached in the stated order to the PDCP-SDU (PDCP payload) at the PDCP (Packet Data Convergence Protocol) layer, the RLC (Radio Link. Control) layer, and the MAC (Medium Access Control) layer, respectively.

As described above, the mobile terminal according to the present embodiment achieves synchronization of IP packets by detecting CRC codes. Accordingly, the upper-level layer is processed in terms of IP packets, without using a protocol such as PPP.

(2) Second Embodiment

A description is given of a mobile terminal that is a second embodiment of a communication device according to the present invention.

The mobile terminal according to the second embodiment has improved reliability in terms of detecting packets at the second packet detecting unit 15, compared to the mobile terminal according to the first embodiment. The configuration of the mobile terminal according to the second embodiment is substantially the same as that illustrated in FIG. 2, and the following mainly describes the differences between the second embodiment and FIG. 2.

(2-1) Configuration of Mobile Terminal (UE)

In the mobile terminal according to the present embodiment, when the state machine 20 is in the state SB (see FIG. 4), the CRC processing unit 19 (second detecting unit) generates CRC codes based on a predetermined generation polynomial equation, from data that is sequentially stored in an internal buffer every time one byte data is input from the S/P interface 12. Then, the CRC processing unit 19 determines whether the generated CRC code matches a predetermined amount of input data succeeding the input data (process target data) that is used as the basis of generating CRC codes (here, a "predetermined amount" is the expected data amount of a CRC code). When the determination result indicates that they match, the CRC processing unit 19 transmits a signal indicating that a CRC code has been detected, to the state machine 20 (CRC detection report).

In the present embodiment, the second packet detecting unit 15 performs the following process. The counter 152 (measuring unit) starts operating as input is received from the selector 13 (S/P interface 12). The one byte data from the selector 13 is sequentially stored in the buffer 153. The header analysis unit 151 estimates that the front position of the data input from the selector 13 is at the front position of the header of the packet succeeding the packet already detected, and reads the packet length from a predetermined field of the header.

The second packet detecting unit 15 (second determination unit) verifies whether the read packet length is correct, based on the count value of the counter 152 at the time point when the CRC detection report is received. The verification of the packet length is performed by determining whether the number of bytes of the read packet length corresponds to the count value. When the determination result indicates that they match, the second packet detecting unit 15 determines that the packet has been correctly detected (synchronization detection).

(2-2) Data Processing by Mobile Terminal (UE)

Figure 10:
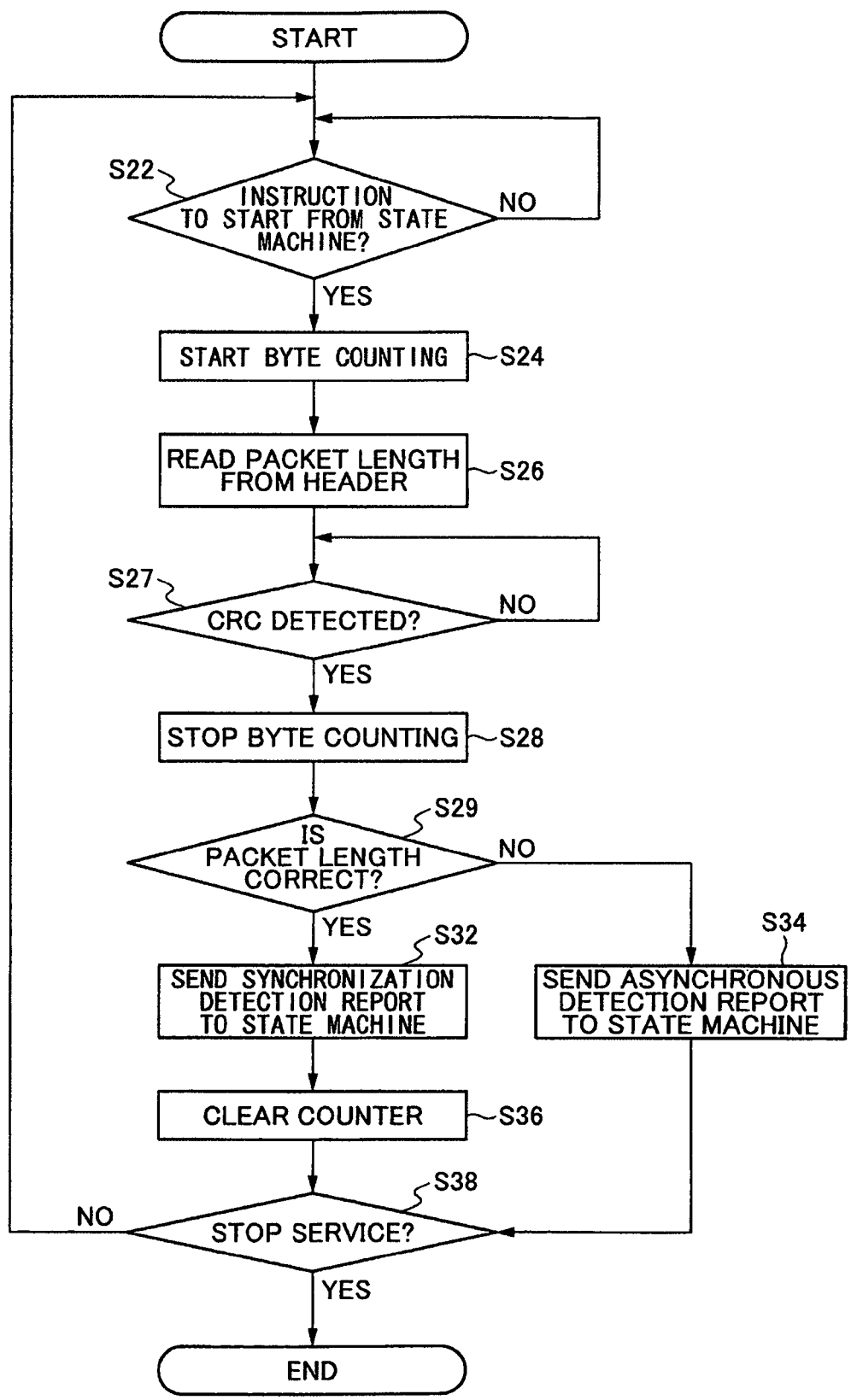
FIG. 10 is a flowchart of a process in a mobile terminal according to a second embodiment.

Next, with reference to FIG. 10, a description is given of data processing performed by the mobile terminal according to the present embodiment. The process performed when the state machine 20 is in a state SA (see FIG. 4) is the same as that of the first embodiment, and therefore a description is given only of the case where the state machine 20 is in a state SB (see FIG. 4). In the flowchart of FIG. 10, the steps corresponding to those of FIG. 6 are denoted by the same step numbers.

In FIG. 10, first, the state machine 20 instructs the second packet detecting unit 15 to start the process (step S22), and the selectors 13 and 16 are controlled. Accordingly, one byte data from the S/P interface 12 is sequentially transmitted to and stored in the CRC processing unit 19 and the second packet detecting unit 15.

When data is input from the S/P interface 12, at the second packet detecting unit 15, the counter 152 starts counting the number of input bytes (step S24). The second packet detecting unit 15 estimates that the front position of the data input from the selector 13 (S/P interface 12) is the front position of the header of the packet succeeding the packet that has already been detected, and reads the packet length from a predetermined field of this header (step S26).

When the second packet detecting unit 15 receives the CRC detection report from the CRC processing unit 19 (step S27), the second packet detecting unit 15 stops the counter 152 (step S28). Then, the second packet detecting unit 15 reads the value of the counter 152, determines whether the count value matches the number of bytes of the packet length read at step S26, and determines whether the read packet length is correct (step S29). That is to say, verification of the packet length is performed.

When the second packet detecting unit 15 determines in step S29 that the packet length is correct, the second packet detecting unit 15 transmits a synchronization detection report to the state machine 20 (step S32), and clears the counter 152 (step S36). Meanwhile, when the second packet detecting unit 15 determines in step S29 that the packet length is incorrect, the second packet detecting unit 15 transmits an asynchronous detection report to the state machine 20 (step S34).

Thereafter, in step S38, the second packet detecting unit 15 continues to detect packets until the CPU 2 instructs to stop the services of the state machine 20.

(2-3) Transfer Uplink Data From External TE to Mobile Terminal (UE)

Figure 11:
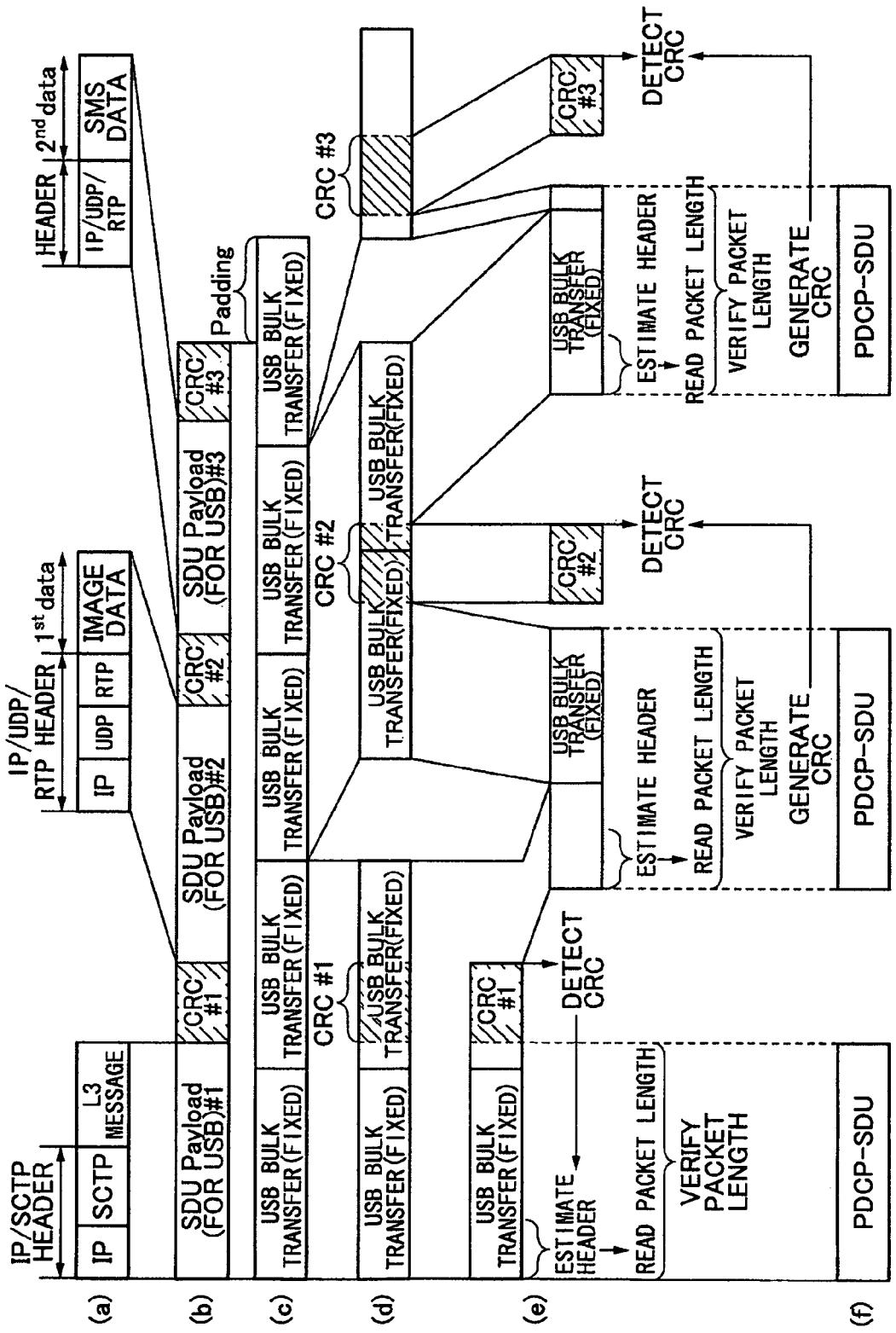
FIG. 11 illustrates the flow of transferring uplink data from the external TE to the mobile terminal according to the second embodiment.

FIG. 11 illustrates transfer of uplink data from the external TE to the mobile terminal according to the present embodiment. FIG. 11 is the same as FIG. 9 described in the first embodiment except for the process at (e).

In FIG. 11 (e), in the uplink data processing unit 4 of the mobile terminal, the first packet detecting unit 14 mainly operates to detect the CRC #1, estimate the header and read the packet length, and confirm whether the packet length is normal. Accordingly, the first IP packet having the CRC #1 attached is detected. The above steps are the same as those of the process indicated in FIG. 9.

Once the first IP packet is detected, the second packet detecting unit 15 mainly operates to estimate the header from the data succeeding the CRC #1 and read the packet length. Then, the CRC code is detected, and the packet length is verified based on the counter value, to detect the next IP packet to which CRC #2 is attached. Similarly, the next IP packet having the CRC #3 attached is detected.

As described above, in the mobile terminal according to the present embodiment, packet synchronization continuously performed after detecting the first packet is not performed by depending only on reading the packet length, but also by sequentially verifying the read packet length based on the detection of the CRC code. Therefore, the reliability of detecting packets is enhanced.

(3) Third Embodiment

A description is given of a mobile terminal that is a third embodiment of a communication device according to the present invention.

In the mobile terminal according to the third embodiment, the speed of data processing is increased compared to the mobile terminals according to the first and second embodiments. In order to increase the speed of data processing, in the mobile terminal according to the present embodiment, the second packet detecting unit 15 implements control so that input and output of data is performed in parallel along the time axis (pipeline process).

(3-1) Configuration of Mobile Terminal (UE)

Figure 12:
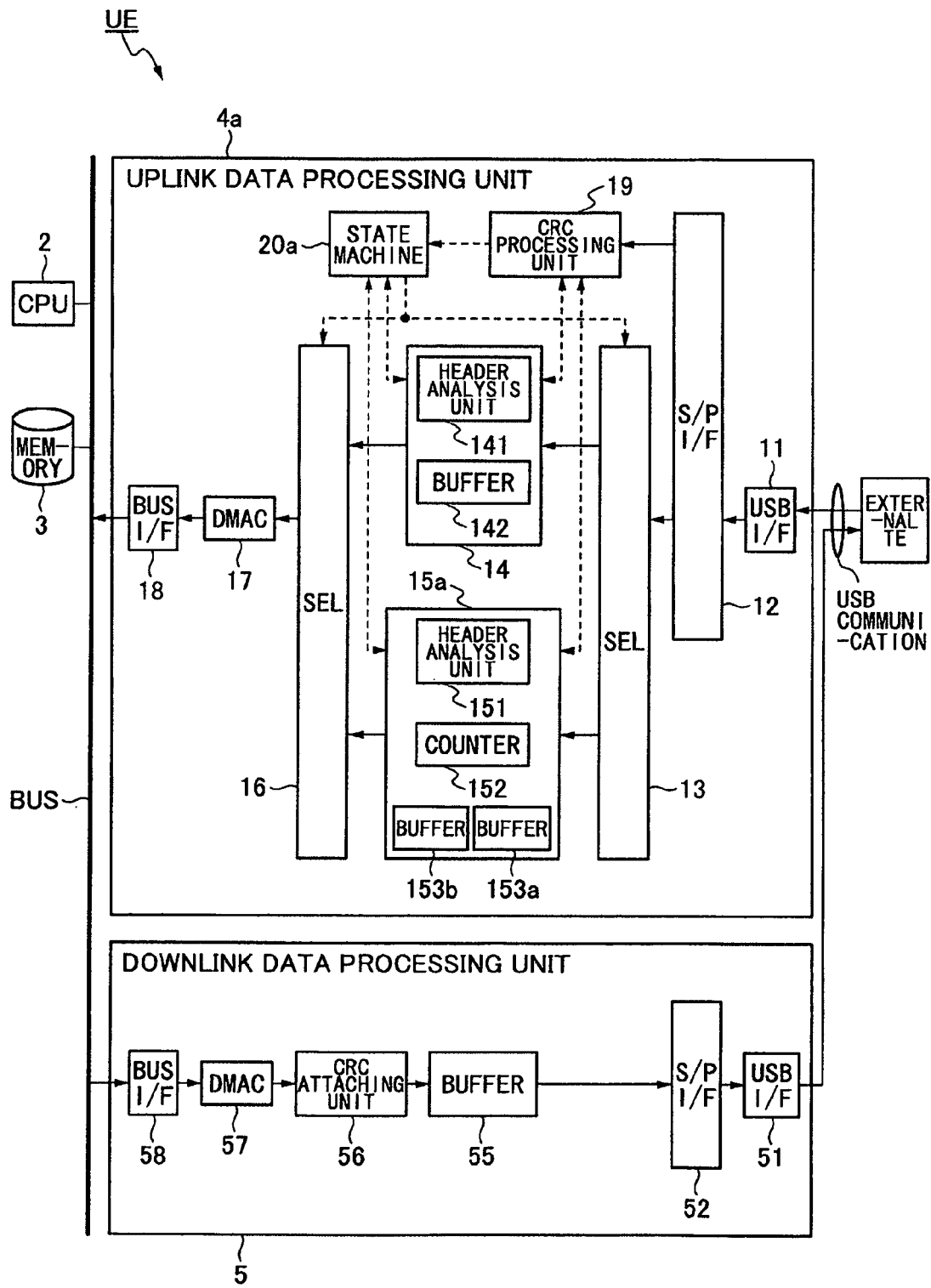
FIG. 12 is a block diagram indicating relevant parts of a configuration of a mobile terminal according to a third embodiment.

FIG. 12 illustrates the configuration of the mobile terminal according to the third embodiment. Elements corresponding to those of the first embodiment are denoted by the same reference numerals, and are not further described.

As illustrated in FIG. 12, in the mobile terminal according to the present embodiment, an uplink data processing unit 4a is different from the uplink data processing unit 4 indicated in FIG. 2 in terms of a second packet detecting unit 15a and a state machine 20a. The second packet detecting unit 15a is different from the second packet detecting unit 15 in that the second packet detecting unit 15a includes a pair of buffers (BUF) 153a and 153b configuring a double buffer (a so-called ping-pong buffer). Each of the buffers 153a and 153b has a capacity corresponding to the expected packet size.

Every time a packet is detected by the second packet detecting unit 15a, the buffer to be used as a processing target is alternately switched between the buffers 153a and 153b. The one byte data items from the selector 13 are stored in the buffer that is the processing target, and the data in the buffer that is the processing target becomes the processing target of the header analysis unit 151 and the counter 152. For example, packets are output from the buffer 153b in parallel to the time period during which data is input to the buffer 153a (buffer that is the processing target). Similarly, packets are output from the buffer 153a in parallel to the time period during which data is input to the buffer 153b (buffer that is the processing target).

Figure 13:
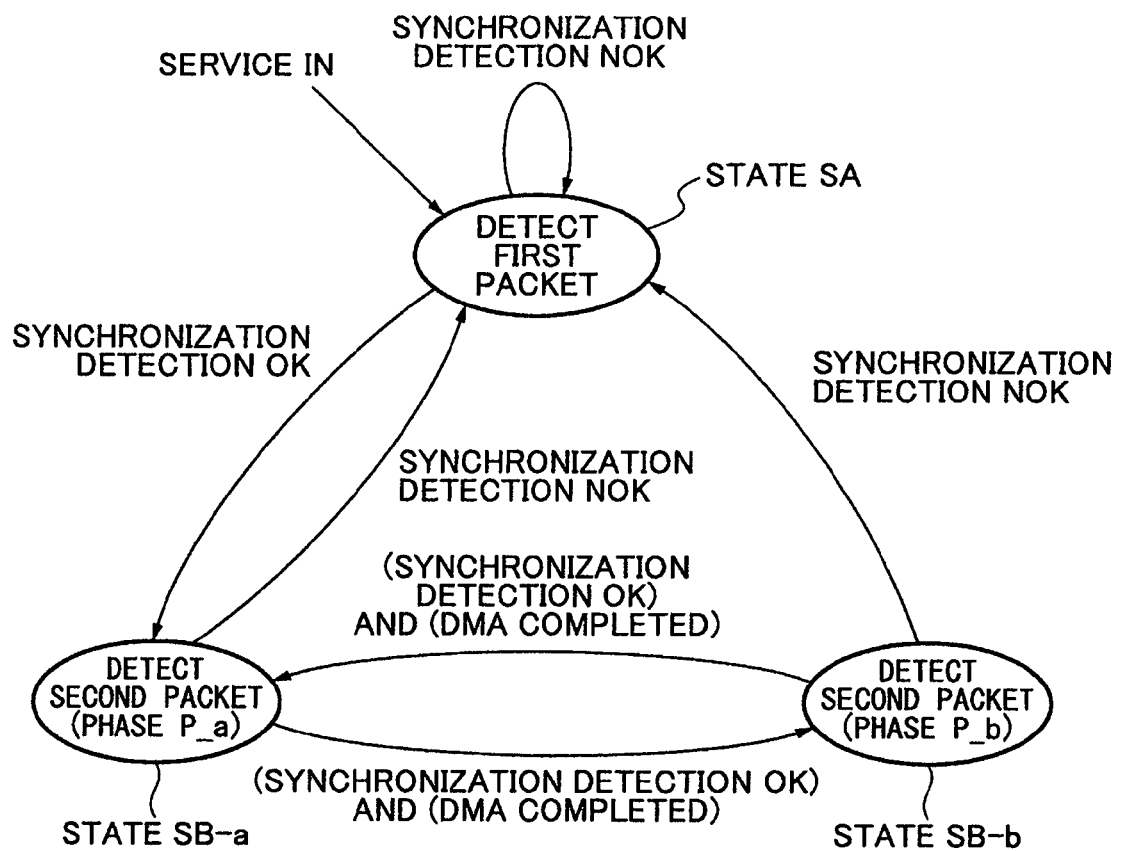
FIG. 13 is a state transition diagram of a state machine in the mobile terminal according to the third embodiment.

FIG. 13 is a state transition diagram of the state machine 20a. A description is given of state transitions of the state machine 20a in association with operations in the uplink data processing unit 4a in the respective states. In FIG. 13, the process of the second packet detecting unit 15a is separated into a pair of phases P_a and P_b.

In FIG. 13, when the process of the uplink data processing unit 4a is started (service in), the first packet detecting unit 14 is in a state (state SA) for detecting packets (first packet detection). Accordingly, the selectors 13 and 16 are controlled so that one bit data from the S/P interface 12 is sequentially input to the first packet detecting unit 14 and the first packet detecting unit 14 performs the packet detection process.

When the CRC processing unit 19 detects CRC and the verification result of the packet length performed by the first packet detecting unit 14 is OK (synchronization detection OK), the state machine 20a transits to a state (state SB_a) where the second packet detecting unit 15a detects packets at phase P_a (second packet detection P_a). Accordingly, the selectors 13 and 16 are controlled, and one bit data from the S/P interface 12 is sequentially stored in the buffer 153a in the second packet detecting unit 15a. Then, when a signal indicating that a packet is detected (PACKET_RCVD signal of an L level) and a DMA_COMPL signal indicating that DMA has been completed ((synchronization detection OK) and (DMA completed)), the state machine 20a transits to a state (state SB_b) where the second packet detecting unit 15a detects packets at phase P_b (second packet detection P_b).

When the state machine 20a transits to the state SB_b, the selectors 13 and 16 are controlled, and one bit data from the S/P interface 12 is sequentially stored in the buffer 153b in the second packet detecting unit 15a. Then, when a signal indicating that a packet is detected (PACKET_RCVD signal of an L level) and a DMA_COMPL signal indicating that DMA has been completed ((synchronization detection OK) and (DMA completed)), the state machine 20a transits to the state SB_a once again. Thereafter, the state machine 20a transits between the state SB_a and the state SB_b every time a packet is detected.

When synchronization detection is NOK while the state machine 20a is in either the state SB_a or the state SB_b, the state machine 20a transits to the state SA.

(3-2) Uplink Data Processing

Figure 14:
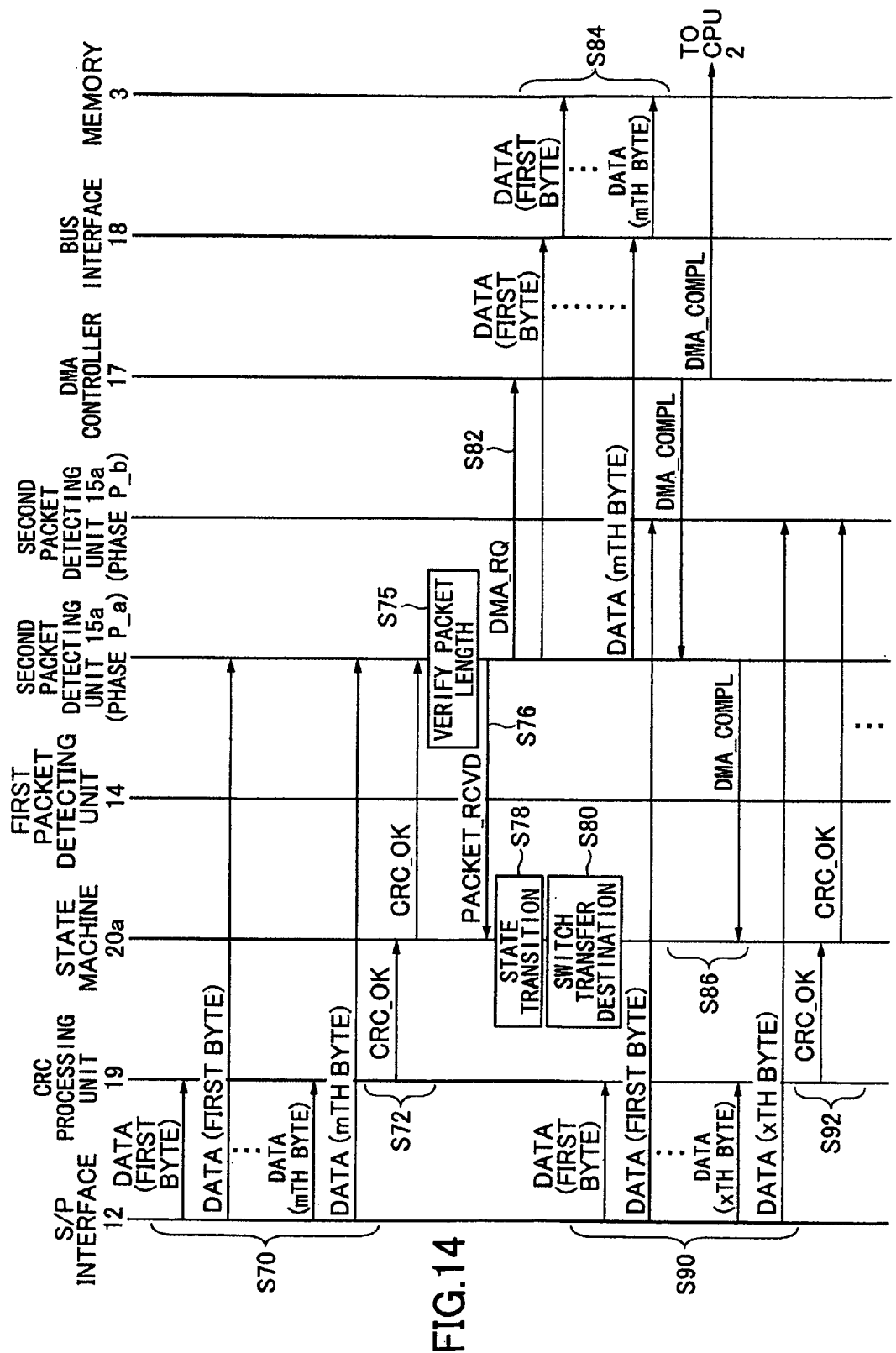
FIG. 14 is a flowchart illustrating a data flow in the mobile terminal according to the third embodiment.

Next, a description is given of uplink data processing performed in the mobile terminal according to the present embodiment, with reference to FIG. 14. FIG. 14 is a flowchart illustrating data flows when the state machine 20a is in the state SB_a or the state SB_b. The data flow when the state machine 20a is in the state SA is the same as that illustrated in FIG. 7. In FIG. 14, the processing steps corresponding to those in FIG. 8 are denoted by the same reference numerals as those of FIG. 8.

In FIG. 14, in order to separate the process of the second packet detecting unit 15a into the respective phases, there are indications of the second packet detecting unit 15a (phase P_a) and the second packet detecting unit 15a (phase P_b).

Once the first packet is detected, the state machine 20a transits to the state SB_a (see FIG. 13). The state machine 20a instructs the second packet detecting unit 15a (phase P_a) to start a process. Accordingly, the one byte data from the S/P interface 12 is sequentially transmitted to the CRC processing unit 19 and the second packet detecting unit 15 (step S70). In the second packet detecting unit 15a (phase P_a), the one byte data is sequentially stored in the buffer 153a.

In step S72, the CRC processing unit 19 transmits a CRC_OK signal to the state machine 20a as a CRC detection report. The CRC_OK signal is further transmitted to the second packet detecting unit 15a (phase P_a). When the CRC_OK signal (CRC detection report) is received, the second packet detecting unit 15a (phase P_a) performs verification of the packet length (step S75). When the packet length is OK, the second packet detecting unit 15a (phase P_a) transmits a PACKET_RCVD signal of an L level as a synchronization detection report to the state machine 20a (step S76).

At this time point, it is assumed that the state machine 20a has received, from the second packet detecting unit 15a (phase P_b), a DMA_COMPL signal indicating that DMA transfer of a packet detected before step S70 is completed. In this case, the state machine 20a transits from the state SB_a to the state SB_b (see FIG. 13) (step S78). Accordingly, one byte data from the S/P interface 12 is sequentially transmitted to the CRC processing unit 19 and the second packet detecting unit 15a (phase P_b). In the second packet detecting unit 15a (phase P_b), the transfer destination of input data from the S/P interface 12 is switched (step S80), and the one byte data is sequentially stored in the CRC processing unit 19 and the buffer 153b of the second packet detecting unit 15a (phase P_b) (step S90). Then, a CRC_OK signal that is a CRC detection report is transmitted from the CRC processing unit 19 to the state machine 20a, and then to the second packet detecting unit 15a (phase P_b) (step S92).

Meanwhile, after step S76, the second packet detecting unit 15a transmits, to the DMA controller 17, a DMA_RQ signal requesting a DMA for transferring the detected packet (input data in the buffer 153a) to the memory 3 (step S82). Subsequently, the detected packet is sequentially transferred, in units of one byte data, to the memory 3 through the bus interface 18 (step S84).

As to steps S84 and S90, the processes are performed for different buffers, and therefore at least part of the processes can be performed in parallel along the time axis.

When the data transfer at step S84 is completed, a DMA_COMPL signal indicating that DMA transfer has been completed is transmitted to the CPU 2 and the second packet detecting unit 15a (phase P_a) from the DMA controller 17. The DMA_COMPL signal is further transmitted to the state machine 20a (step S86). Accordingly, the second packet detecting unit 15a (phase P_a) is ready to start processing once the second packet detecting unit 15a (phase P_b) has completed the synchronization detection.

As described above, in the mobile terminal according to the present embodiment, in the packet detection process performed continuously after the first packet is detected, the operations of inputting data and outputting (transferring) packets are controlled to be performed in parallel along the time axis. Accordingly, in the mobile terminal according to the present embodiment, the speed of data processing for packet synchronization is increased.

Embodiments of the present invention are described above in detail; however, the communication device and packet synchronization method of the present invention are not limited to the above embodiments. Variations and modifications are included in the present invention without departing from the spirit of the present invention.

For example, in the above embodiments, a process for reading the packet length of IP packets is performed. This process may be changed according to version information of the IP packet. More specifically, IPv4 and IPv6 are different in terms of the field position of the information indicating the packet length included in the header of the IP packet. Therefore, in the process of reading the packet length of the IP packet, the version information is first read, and after the version information recognized, the packet length is read from an appropriate field position. In both the IPv4 and IPv6, the version information is positioned at the front of the header.

Furthermore, the above embodiments are mainly described from the viewpoint of achieving synchronization of IP packets, but obviously the type of packet is not limited. That is to say, this packet synchronization method is based on the detection of CRC codes attached between adjacent packets. The type of the packet itself is not limited as long as it is possible to read information indicating the packet length from a known location.

According to a communication device and a packet synchronization method disclosed herein, the communication device achieves packet synchronization from input data transmitted by an external device, without using a special protocol between the communication device and the external device.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A communication device for achieving packet synchronization with respect to data input from an external device, the communication device comprising:
   one or more processors configured to:
   perform a check on check target data using a predetermined amount of first input data as a check code each time a unit amount of data is input and determine that the check code is detected when a result of the check is successful, the check target data being input data preceding the first input data;
   assume that a start position of the check target data at a time when the check code is detected corresponds to a start position of a header of a first packet, and read a packet length of the first packet from the header of the first packet;

determine whether a length of the check target data at the time when the check code is detected matches the read packet length of the first packet;

assume that a start position of input data succeeding the check code corresponds to a start position of a header of a second packet succeeding the first packet, and read a packet length of the second packet from the header of the second packet;

measure an input data length starting from the start position of the header of the second packet, every time the unit amount of the data is input;

detect the check code by generating a predetermined amount of the check code corresponding to process target data every time the unit amount of the data is input, the process target data corresponding to the input data starting from the start position of the header of the second packet, the check code being detected when the generated check code matches the predetermined amount of the input data succeeding the process target data; and determine whether a length of the process target data at the time when the check code is detected matches the measured input data length, wherein the communication device is connected via a USB cable to the external device and receives data transferred from the external device in a bulk transfer mode, wherein the first packet and the second packet are IP (Internet Protocol) packets, and wherein the one or more processors respectively read the packet lengths of the first packet and the second packet from headers of the IP packets, according to version information located at a predetermined position in the headers of the IP packets.

2. The communication device according to claim 1, wherein after it is determined that the length of the check target data matches the packet length of the first packet, the one or more processors sequentially read packet lengths of packets succeeding the first packet to achieve synchronization of the packets succeeding the first packet.

3. The communication device according to claim 2, wherein when it is determined that the length of the process target data does not match the input data length, is the one or more processors are controlled not to detect the check code.

4. The communication device according to claim 1, comprising:

a double buffer configuration by which input of the data and output of the second packet are performed in parallel along a time axis.

5. A packet synchronization method for achieving packet synchronization with respect to data input from an external device, the packet synchronization method comprising:

performing a check on check target data using a predetermined amount of first input data as a check code each time a unit amount of data is input and determining that the check code is detected when a result of the check is successful, the check target data being input data preceding the first input data;

assuming that a start position of the check target data at a time when the check code is detected corresponds to a start position of a header of a first packet, and reading a packet length of the first packet from the header of the first packet;

determining whether a length of the check target data at the time when the check code is detected matches the packet length of the first packet that has been read;

assuming that a start position of input data succeeding the check code that has been detected corresponds to a start position of a header of a second packet succeeding the first packet, and reading a packet length of the second packet from the header of the second packet;

measuring an input data length starting from the start position of the header of the second packet, every time the unit amount of the data is input;

detecting the check code by generating a predetermined amount of the check code corresponding to process target data every time the unit amount of the data is input, the process target data corresponding to the input data starting from the start position of the header of the second packet, the check code being detected when the generated check code matches the predetermined amount of the input data succeeding the process target data; and determining whether a length of the process target data at the time when the check code is detected matches the input data length that has been measured, wherein the external device is connected to a communication device via a USB cable and data is transferred from the external device in a bulk transfer mode, wherein the first packet and the second packet are IP (Internet Protocol) packets, and wherein the packet lengths of the first packet and the second packet are respectively read from headers of the IP packets, according to version information located at a predetermined position in the headers of the IP packets.

6. A communication system comprising:

a first communication device; and a second communication device that achieves packet synchronization with respect to data input from the first communication device, wherein the first communication device attaches check codes to packets before outputting the data to the second communication device, and the second communication device includes:

a first detecting unit configured to perform a check on check target data using a predetermined amount of first input data as a check code each time a unit amount of data is input and determine that the check code is detected when a result of the check is successful, and the check target data being input data preceding the first input data;

a first header analysis unit configured to assume that a start position of the check target data at a time when the check code is detected by the first detecting unit corresponds to a start position of a header of a first packet, and to read a packet length of the first packet from the header of the first packet;

a first determination unit configured to determine whether a length of the check target data at the time when said the check code is detected by the first detecting unit matches the packet length of the first packet read by the first header analysis unit;

a second header analysis unit configured to assume that a start position of input data succeeding the check code detected by the first detecting unit corresponds to a start position of a header of a second packet succeeding the first packet, and to read a packet length of the second packet from the header of the second packet;

a measuring unit configured to measure an input data length starting from the start position of the header of the second packet, every time the unit amount of the data is input;

a second detecting unit configured to detect the check code by generating a predetermined amount of the check code corresponding to process target data every time the unit amount of the data is input, the process target data corresponding to the input data starting from the start position of the header of the second packet, the check code being detected when the generated check code matches the predetermined amount of the input data succeeding the process target data; and a second determination unit configured to determine whether a length of the process target data at the time when the second detecting unit detects the check code matches the input data length measured by the measuring unit, wherein the first communication device is connected via a USB cable to the second communication device and data is transferred in a bulk transfer mode, wherein the first packet and the second packet are IP (Internet Protocol) packets, and wherein the packet lengths of the first packet and the second packet are respectively read from headers of the IP packets, according to version information located at a predetermined position in the headers of the IP packets.

\* \* \* \* \*

UNITED STATES PATENT AND TRADEMARK OFFICE
CERTIFICATE OF CORRECTION

| | |
|---|---|
| PATENT NO. | : 8,891,558 B2 |
| APPLICATION NO. | : 13/137758 |
| DATED | : November 18, 2014 |
| INVENTOR(S) | : Daitarou Furuta |

Page 1 of 1

It is certified that error appears in the above-identified patent and that said Letters Patent is hereby corrected as shown below:

In the Claims
Column 16, Line 54, in Claim 6, delete "said the" and insert -- the said --, therefor.

Signed and Sealed this
Fifth Day of May, 2015

Michelle K. Lee
*Director of the United States Patent and Trademark Office*